(12) United States Patent
Cho et al.

(10) Patent No.: US 7,386,277 B2
(45) Date of Patent: Jun. 10, 2008

(54) COMMUNICATION SYSTEM AND METHOD FOR INCREASING COMMUNICATION EFFICIENCY

(75) Inventors: Myeon-gyun Cho, Seongnam (KR); Ho-jin Kim, Seoul (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 1155 days.

(21) Appl. No.: 10/233,014

(22) Filed: Sep. 3, 2002

(65) Prior Publication Data
US 2003/0063587 A1  Apr. 3, 2003

(30) Foreign Application Priority Data
Sep. 3, 2001   (KR) .......................... 2001-0053849

(51) Int. Cl.
*H04B 1/00*  (2006.01)
(52) U.S. Cl. ....................... 455/69; 455/515; 455/134; 455/135; 455/226.1; 370/342; 370/335; 370/259; 370/252; 375/358; 375/299; 375/347
(58) Field of Classification Search ................ 370/252, 370/316–350, 259; 375/358, 377, 299, 347; 455/130, 134, 135, 226.1, 226.2, 69, 515
See application file for complete search history.

(56) References Cited

U.S. PATENT DOCUMENTS

| | | | |
|---|---|---|---|
| 6,366,601 B1 * | 4/2002 | Ghosh et al. ................ | 375/130 |
| 6,704,896 B1 * | 3/2004 | Maeda ........................ | 714/733 |
| 6,704,898 B1 * | 3/2004 | Furuskar et al. ............ | 714/751 |
| 6,850,499 B2 * | 2/2005 | Wheatley et al. ........... | 370/328 |
| 7,027,420 B2 * | 4/2006 | Hamalainen ................. | 370/335 |
| 2002/0141362 A1 * | 10/2002 | Hsu et al. .................... | 370/331 |
| 2003/0081692 A1 * | 5/2003 | Kwan et al. ................. | 375/295 |

FOREIGN PATENT DOCUMENTS

| | | |
|---|---|---|
| EP | 0 903 883 | 3/1999 |
| EP | 1 054 526 | 11/2000 |

OTHER PUBLICATIONS

Holland, et al., "A Rate-Adaptive MAC Protocol for Multi-Hop Wireless Networks", Proceedings of the 7th Ann. Intnl. Conference on Mobile Computing and Networking, Rome, Italy, pp. 236-250.
Ericsson, et al., "Hybrid Type-II ARQ/AMS Supported by Channel Predictive Scheduling in a Multi-User Scenario", IEEE Vehicular Technology Conference, Boston, MA, US, pp. 1804-1811.

* cited by examiner

*Primary Examiner*—Ricky Q. Ngo
*Assistant Examiner*—Kibrom T Hailu
(74) *Attorney, Agent, or Firm*—Lee & Morse, P.C.

(57) ABSTRACT

A mobile communication system capable of increasing communication efficiency and a method therefor are provided, including a receiver for grouping n MCS levels (where n>0) into continuous m MCS levels (where n>m>0) according to the quality of a data channel for transmitting an information signal, and sending information on an MCS group using a pilot signal, and an ACK or an NACK signal, which indicates whether the information signal is completely received; and a transmitter for storing information on the n MCS levels, extracting the m MCS levels according to the information on the MCS group transmitted from the receiver, determining one of the extracted m MCS levels as an initial MCS level, modulating and coding information data to be transmitted according to the initial MCS level and transmitting the result to the receiver, and changing the current MCS level in response to the ACK or the NACK signal.

25 Claims, 6 Drawing Sheets

| MCS LEVEL | MODULATION | CODING |
|---|---|---|
| MCS 1 | QPSK | 1/4 |
| MCS 2 | QPSK | 1/2 |
| MCS 3 | QPSK | 3/4 |
| MCS 4 | 8 PSK | 3/4 |
| MCS 5 | 16 QAM | 1/2 |
| MCS 6 | 16 QAM | 3/4 |
| MCS 7 | 64 QAM | 3/4 |

COMMUNICATION SYSTEM AND METHOD FOR INCREASING COMMUNICATION EFFICIENCY

BACKGROUND OF THE INVENTION

1. Field of the Invention

The present invention relates to a mobile communication system. More particularly, the present invention relates to a mobile communication system capable of increasing communication efficiency with an adaptive modulation and coding (AMC) scheme, and a method therefor.

2. Description of the Related Art

In order to transmit a large quantity of data to a wireless channel environment, information regarding a current channel obtained from a receiver must be sent to a transmitter at a precise time. In this arrangement, it is possible to change a modulation mode and a coding mode according to the condition of a current channel, and transmit a large amount of data without a loss in data. Here, much attention is directed to how to transmit information regarding a channel from the receiver to the transmitter with the least amount of feedback bits and without an error or delay in transmission, thereby saving wireless channel resources. Additionally, the transmitter is required to select the optimum level out of a plurality of levels of a modulation and coding scheme (MCS), using the channel information transmitted from a receiver, and to transmit a large amount of data to a wireless channel environment.

In general, a common pilot channel (CPICH) method or a cyclic redundancy check (CRC) method is adopted to identify the channel environment of a receiver and to change a combination level of an MCS level according to the detected channel environment.

Figure 1:
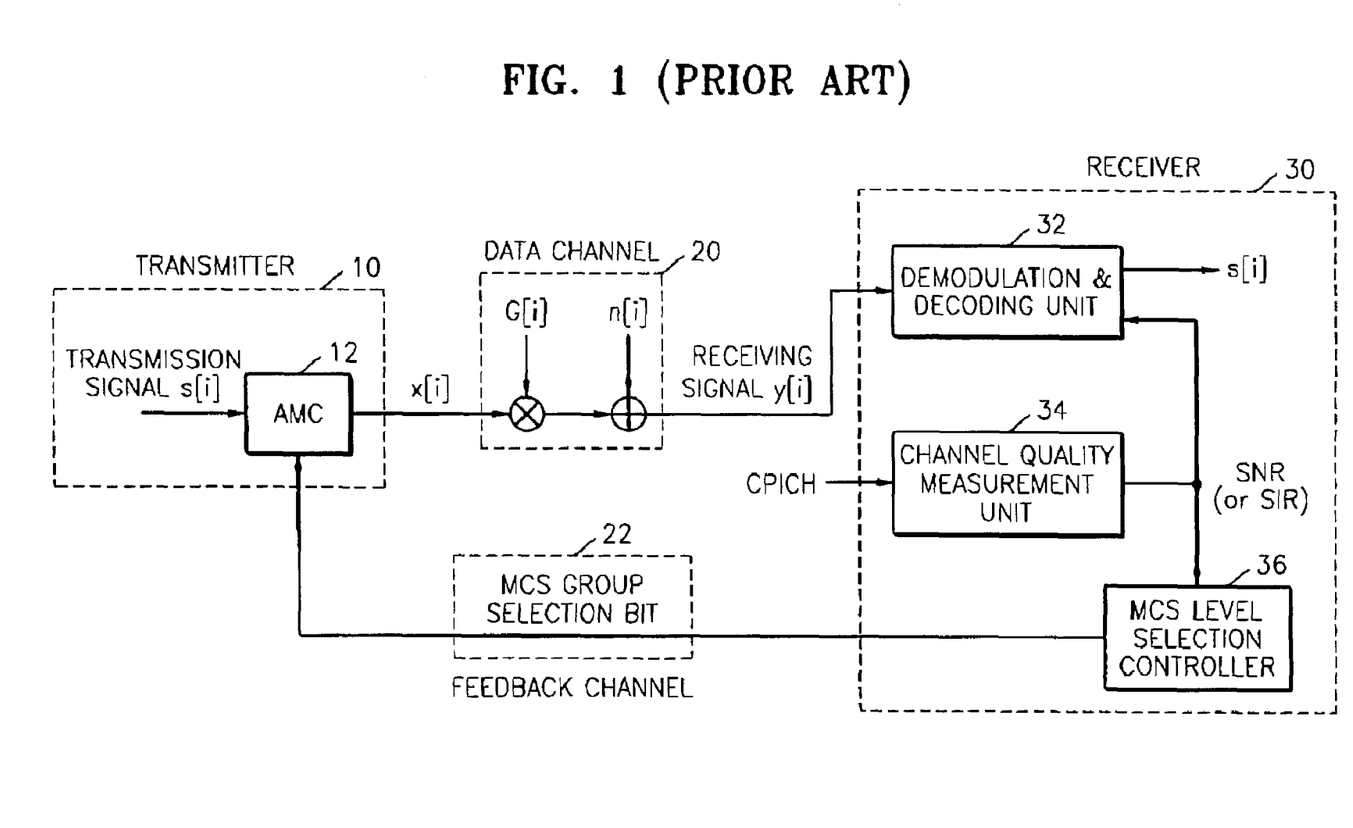
FIG. 1 is a schematic block diagram of a conventional mobile communication system adopting a common pilot channel (CPICH) method.

FIG. 1 is a schematic block diagram of a conventional mobile communication system adopting the CPICH method. This mobile communication system includes a transmitter 10, a data channel 20, a receiver 30, and a feedback channel 22. The transmitter 10 includes an adaptive modulation and coding (AMC) unit 12. The receiver 30 includes a demodulation & decoding unit 32, a channel quality measurement unit 34, and an MCS level selection controller 36.

Figure 2:
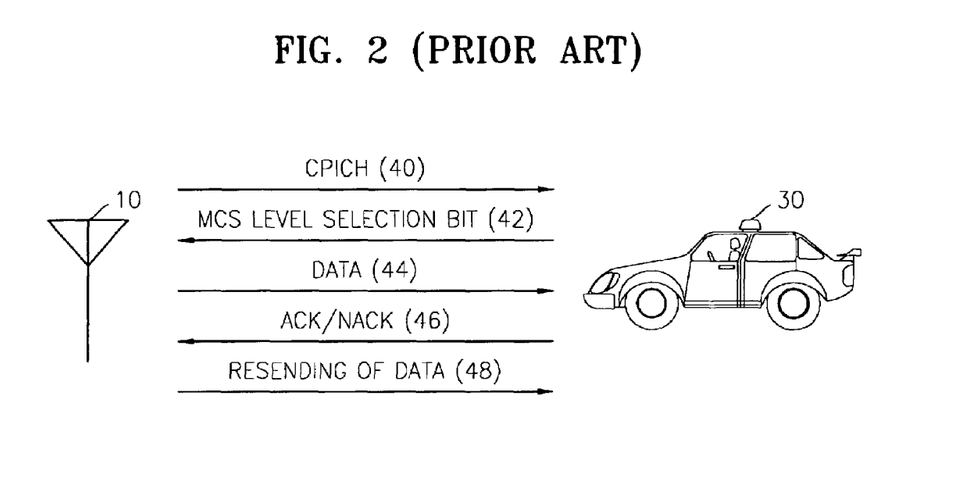
FIG. 2 is a view explaining a conventional process of exchanging data between a transmitter and a receiver.

FIG. 2 is a view explaining a process of exchanging data between the transmitter 10 and the receiver 30.

Referring to FIGS. 1 and 2, in step 40 of FIG. 2, the transmitter 10 sends channel information together with a pilot signal CPICH, which is used to measure the quality of a channel, to the receiver 30 via a pilot channel (not shown). Then, the channel quality measurement unit 34 of the receiver 30 receives the pilot signal CPICH together with the channel information from the transmitter 10, measures a signal-to-interference ratio (SIR) or a signal-to-noise ratio (SNR) as the quality of a channel using the pilot signal CPICH, and transmits the result to the MCS level selection controller 36.

Figure 3:
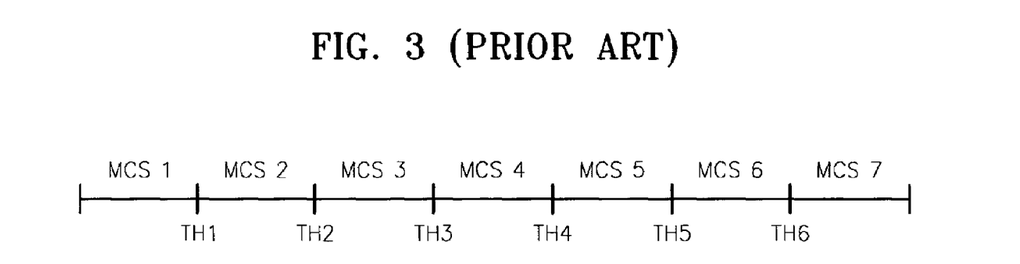
FIG. 3 is a view of modulation and coding scheme (MCS) levels MCS1 through MCS7 and boundary values that define the boundaries between the MCS levels MCS1 through MCS7 in W-CDMA.

The MCS level selection controller 36 selects a level of MCS according to the quality of the channel measured by the channel quality measurement unit 34. FIG. 3 is a view of MCS levels MCS1 through MCS7, and boundary values TH1 through TH6 that define the boundaries between the MCS levels MCS1 through MCS7 in the case of W-CDMA (code division multiple access). Next, in step 42, the MCS level selection controller 36 compares each boundary value with the quality value of a channel measured by the channel quality measurement unit 34, selects a current MCS level based on the comparing result, and transmits information on the selected MCS level to the AMC unit 12 of the transmitter 10.

Referring to FIG. 1, in step 44 of FIG. 2, the AMC unit 12 sends a signal x[i], which is a transmission signal s[i] modulated and coded according to the MCS level transmitted from the MCS level selection controller 36, to the receiver 30 via the data channel 20. While passing through the data channel 20, the signal x[i] is combined with channel noise G[i] and white noise n[i] and becomes a signal y[i]. Finally, the signal y[i] is transmitted to the receiver 30.

Although not shown in FIG. 1, in step 46 of FIG. 2, either the receiver 30 sends an acknowledgement (ACK) signal to the transmitter 10 when it completely receives data from the transmitter 10 or the receiver 30 sends a signal NACK when it fails to completely receive the data. In step 48, when the transmitter 10 receives the NACK signal from the receiver 30, it resends the data to the receiver 30.

As previously mentioned, according to the CPICH method, the receiver 30 measures the quality of a current channel, using a pilot signal transmitted from the transmitter, and selects and transmits the optimum MCS level to the transmitter. Then, the transmitter determines the degree of modulation and coding according to the optimum MCS level, and returns the result to the receiver.

This conventional CPICH method, however, wastes uplink wireless channel resources because MCS selection bits corresponding to the number of MCS levels must be periodically transmitted to a transmitter at predetermined instants of time. For instance, in current W-CDMA that classifies the MCS into seven levels, the channel quality measurement unit 34 transmits three bit MCS selection bits to the transmitter at every three slots. In addition, six comparators are required to compare a measured quality value of a channel with each of the boundary values TH1 through TH6, thereby complicating the circuit structure of a mobile communication system. These comparators are installed in a receiver, i.e., a handset, which causes an increase in the power consumption of the handset.

Further, when the receiver has an error in measuring a channel and a delay in feedback, the actual conditions of the channel may be different from the measured conditions of the channel at the time when a transmitter modulates and codes a signal and transmits the result to the receiver based on channel information measured by the receiver. This will lower throughput. Here, the delay in feedback is the delay of time that is spent while the channel quality measurement unit 34 measures the quality of a channel and the MCS selection controller 34 selects the optimum MCS level according to the measured quality of the channel. In other words, the greater the number of MCS levels, the longer the time lost in selecting the optimum MCS level and the longer a delay in feedback become.

Figure 4:
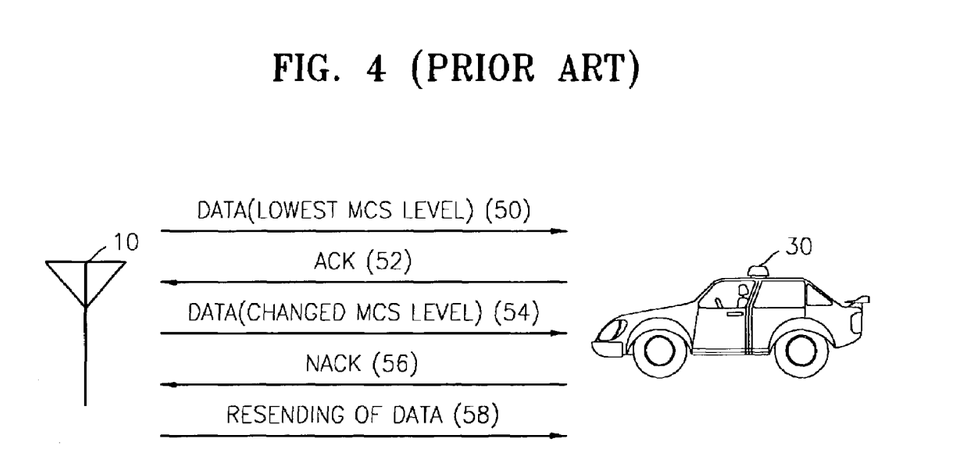
FIG. 4 is a view explaining a conventional process of exchanging data between a receiver and a transmitter by a cyclic redundancy check (CRC) method.

The CRC method has been recently suggested as an alternative of the CPICH. FIG. 4 is a view explaining a process of exchanging data between a receiver and a transmitter according to a conventional CRC method.

Referring to FIG. 4, in step 50, the transmitter 10 directly sends CRC information, which is used to detect an error in an actual channel, along with data to the receiver 30 without receiving any feedback regarding an MCS level according to the quality of the channel from the receiver 30. At this time, the transmitter 10 transmits the CRC information and data to the receiver 30 at the lowest MCS level. Then, in step 52, the receiver 30 checks whether the CRC information contains an error, and sends an ACK signal if no error is detected. In step 54, if the ACK signal is continuously transmitted from the receiver 30 to the transmitter 10 a predetermined number of times, the transmitter 10 raises the MCS level by one level and then, sends CRC information and data to the receiver 10. However, if the receiver 30 detects an error during the check of the CRC information, in step 56, the receiver 30 sends an NACK signal to the transmitter 10. Subsequently, in step 58, the transmitter 10 lowers the MCS level by one level and resends the data to the receiver 30.

In conclusion, according to the conventional CRC method, the transmitter 10 begins sending data together with CRC information at the lowest MCS level without information on the quality of a channel, and optimizes the MCS level in response to the ACK signal, which is transmitted from the receiver 30 as confirmation of safe receipt of the data, or the NACK signal which is transmitted from the receiver 30 when an error is detected in the CRC information. Therefore, if conditions of a channel are sufficient to transmit data at the highest MCS level, the CRC method requires a long time to achieve a desired MCS level. Also, while the level of the channel increases to a desired MCS level, the transmitter 10 transmits only a small amount of data, which does not match the transmission capability of the channel, thereby reducing data throughput.

As a result, in a conventional mobile communication system, uplink frequency resources are wasted due to the amount of feedback information regarding the quality of a channel and frequent reports on channel information. Further, it is difficult for a transmitter to use to correct channel information at a desired time due to a feedback error and a delay in the transmission of feedback information. Otherwise, an MCS level cannot be adjusted to correspond to the quality of a current channel until information is exchanged between a transmitter and a receiver for considerable time. During this time, a small amount of the transmission of data, which does not match the quality of a channel, is transmitted from a transmitter to a receiver, thereby reducing data throughput.

SUMMARY OF THE INVENTION

In an effort to solve the above-described problems, it is a first feature of an embodiment of the present invention to provide a receiver that can increase communication efficiency with an improved function of feeding back information regarding the quality of a channel, which is used for transmission of data, to a transmitter, and a method therefor.

It is a second feature of an embodiment of the present invention to provide a transmitter capable of increasing communication efficiency by reducing waste of uplink frequency resources, and a method therefor.

It is a third feature of an embodiment of the present invention to provide a mobile communication system including such a receiver and such a transmitter, and capable of increasing communication efficiency.

It is a fourth feature of an embodiment of the present invention to provide a data transmission method performed by such a mobile communication system.

To provide an aspect of the first feature of an embodiment, there is provided a receiver for receiving an information signal and a pilot signal for measuring the quality of a channel, from an external transmitter, the receiver including a demodulation and decoding unit for demodulating and decoding the information signal for detecting information data and cyclic redundancy channel (CRC) data which is used to detect an error contained in the information signal; a channel quality measurement unit measuring the capability of transmission of data of a data channel for receiving the information signal using the pilot signal; and a modulation and coding scheme (MCS) group selection controller for grouping n (where n>0) MCS levels, which are predetermined according to the quality of the data channel, into continuous m MCS levels (where n>m>0), for transmitting information on an MCS group according to the quality of the data channel measured by the channel quality measurement unit, to the transmitter every predetermined cycle, and for transmitting an ACK signal or an NACK signal to the transmitter depending on whether the CRC data is completely received from the transmitter.

To provide another aspect of the first feature of an embodiment of the present invention, there is provided a data communication method performed by a receiver that receives a pilot signal transmitted periodically from an external transmitter for the measurement of the quality of a channel, and an information signal containing CRC data and information data, the data communication method including (a) grouping n MCS levels (where n>0), which are predetermined according to the quality of a data channel for transmitting the information signal, into continuous m MCS levels (where n>m>0); (b) measuring the capability of transmission of data of the data channel every predetermined period using the pilot signal, selecting one MCS group corresponding to the measured transmission capability of the data channel from the MCS groups, and transmitting information on the selected MCS group; (c) restoring the CRC data and the information data from the information signal when the information signal is transmitted from the transmitter; and (d) transmitting an ACK signal or an NACK signal to the transmitter, depending on whether the CRC data is completely transmitted.

To provide an aspect of the second feature of an embodiment of the present invention, there is provided a transmitter for periodically transmitting a pilot signal, which is used to measure the quality of a channel, to an external receiver, and modulating and coding information data to be transmitted according to information on the quality of the channel transmitted from the receiver, the transmitter including a CRC adder for adding CRC data, which is used to detect an error in the channel, to the information data to be transmitted; an MCS level selection controller for storing information on n MCS levels (where n>0), which are predetermined according to the quality of a data channel for transmitting the information data, extracting continuous m MCS levels (where n>m>0) from the MCS levels according to the quality of a channel, selecting one level out of the extracted MCS levels as a initial current MCS level and outputting the information on the selected MCS level, and changing the current MCS level in response to an ACK signal or an NACK signal that is fed back from the receiver that indicates whether an error occurs in the channel; and an adaptive modulation and coding (AMC) unit for modulating and coding information data including the CRC data according to the current MCS level and transmitting the result to the receiver.

To provide another aspect of the second feature of an embodiment of the present invention, there is provided a data communication method performed by a transmitter that periodically transmits a pilot signal, which is used to measure the quality of a channel, to an external receiver, stores information on n MCS levels predetermined according to the quality of the channel (where n>0), and modulates and codes information data to be transmitted in response to the information on the quality of the channel transmitted from the receiver and an ACK signal or an NACK signal that indicates whether data is completely transmitted to the receiver, the data communication method including (a) receiving information on the quality of the channel from the receiver; (b) extracting continuous m MCS levels (where n>m>0) from the n MCS levels according to the information on the quality of the channel, and determining one of the extracted MCS levels as an initial current MCS level; (c) adding CRC data, which is used to detect an error in the channel, to information data to be transmitted to the receiver; (d) modulating and coding the information data including the CRC data according to the initial current MCS level, and transmitting the result to the receiver; and (e) changing the initial current MCS level in response to the ACK signal or the NACK signal transmitted from the receiver.

To provide the third feature of an embodiment of the present invention, there is provided a mobile communication system including a receiver for grouping n MCS levels (where n>0) into continuous m MCS levels (where n>m>0) according to the quality of a data channel for transmitting an information signal, and sending information on an MCS group, which corresponds to the measured quality of the data channel using a pilot signal transmitted from the outside, and an ACK signal or an NACK signal, which indicates whether the information signal is completely received; and a transmitter for storing information on the n MCS levels, extracting the m MCS levels out of the n MCS levels according to the information on the MCS group transmitted from the receiver, determining one of the extracted m MCS levels as an initial current MCS level, modulating and coding information data to be transmitted according to the initial current MCS level and transmitting the result to the receiver, and changing the current MCS level in response to the ACK signal or the NACK signal.

To provide the fourth feature of an embodiment of the present invention, there is provided a data transmission method performed between a transmitter and a receiver which are included in a mobile communication system, wherein the transmitter and the receiver store information on n MCS levels (where n>0) that are predetermined according to the quality of a data channel for transmitting an information signal, the data transmission method including (a) the receiver grouping the n MCS levels into continuous m MCS levels (where n>m>0); (b) the transmitter transmitting a pilot signal to the receiver; (c) the receiver measuring the quality of the data channel, which is the path of transmitting the information signal, using the pilot signal, selecting one of the MCS groups according to the measured quality of the data channel, and sending information on the selected MCS group to the transmitter; (d) the transmitter extracting m MCS levels according to the information on the MCS group, determining one of the extracted m MCS levels as a current MCS level, modulating and coding information to be transmitted according to the current MCS level, and transmitting the result as the information signal to the receiver; (e) the receiver receiving the information signal from the transmitter via the data channel and restoring the original signal from the information signal, and transmitting an ACK signal or an NACK signal, which indicates whether the information signal is normally received, to the transmitter; and (f) the transmitter adjusting the current MCS level in response to the ACK signal or the NACK signal transmitted from the receiver.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Korean Patent Application No. 2001-53849, filed Sep. 3, 2001, and entitled: "Communication System and Method for Increasing Communication Efficiency," is incorporated by reference herein in its entirety.

Hereinafter, a mobile communication system capable of increasing communication efficiency and a method therefor will be described with reference to the accompanying drawings.

Figure 5:
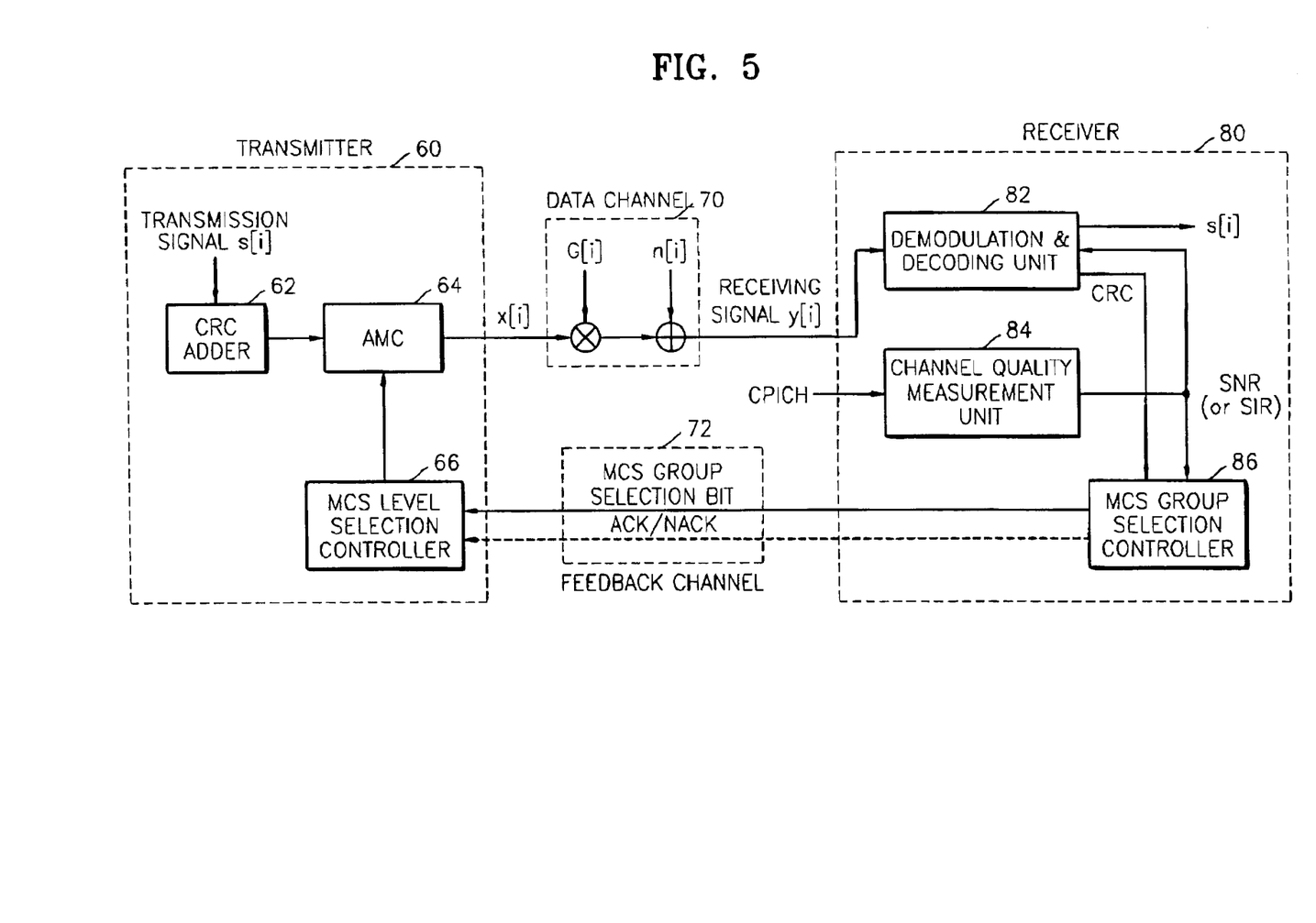
FIG. 5 is a view of a mobile communication system capable of increasing communication efficiency according to an embodiment of the present invention.

FIG. 5 is a schematic block diagram of a preferred embodiment of a mobile communication system capable of increasing communication efficiency according to the present invention. This mobile communication system includes a transmitter 60, a data channel 70, a feedback channel 72, and a receiver 80. For convenience, in this embodiment the mobile communication system adopts a W-code division multiple access (CDMA) method. In the W-CDMA method, a modulation and coding scheme (MCS) is classified into seven levels as shown in FIG. 6.

Figure 6:
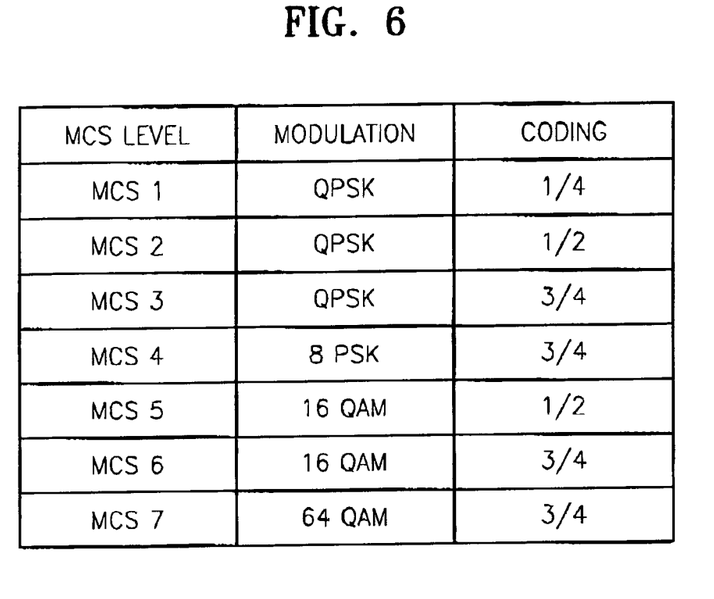
FIG. 6 is a table showing changes in a modulation method and a coding method in W-CDMA according to the level of MCS.

FIG. 6 is a table explaining changes in a modulation method and a coding method in W-CDMA according to the level of MCS. Referring to FIG. 6, MCS1 is an MCS level of the lowest quality, at which level quadrature phase shift keying (QPSK) modulation and ¼ coding are performed. Here, ¼ indicates a ratio of information data with respect to the whole data, which means that one fourth of the whole data is information data and the remaining ¾ is redundant data. On the other hand, MCS7 is an MCS level of the highest quality, at which 64 quadrature amplitude modulation (QAM) and ¾ coding are performed. In conclusion, the larger the level of MCS is, the greater the amount of data that is transmitted, i.e., the throughput increases. Referring to FIG. 5, the transmitter 60 stores information on seven MCS levels that are divided into three groups, and determines one of the seven MCS levels as a current MCS level when information on an MCS group is transmitted from the receiver 80 via the feedback channel 72. Then, the transmitter 60 sends a modulation signal x[i], which is modulated and coded from a transmission signal s[i] to be transmitted according to the current MCS level, to the receiver 80 via the data channel 70. For instance, if the current MCS level is MCS1, the QPSK modulation and ¼ coding are performed, as indicated in FIG. 6. At this time, preferably, the transmitter 60 adds cyclic redundancy check (CRC) data, which is used in the receiver 80 for detecting an error in a channel, into the transmission signal s[i], and then modulates and encodes the result according to the current MCS level. Also, the transmitter 60 adjusts the current MCS level to the optimum MCS level in response to an ACK signal and a NACK signal that are transmitted from the receiver 80 via the feedback channel 72. Preferably, the transmitter 60 includes a CRC adder 62, an adaptive modulation & coding (AMC) unit 64, and an MCS level selection controller 66.

The CRC adder 62 adds the CRC data into the transmission signal s[i] to be transmitted.

The MCS level selection controller 66 stores information on seven MCS levels, which are grouped into three MCS groups. Here, each MCS group includes continuous three MCS levels. The MCS level selection controller 66 determines one MCS level in an MCS group, which is selected corresponding to information on the quality of a channel which is transmitted from the receiver 80 via the feedback channel 72, as a current MCS level, and outputs information regarding the determined current MCS level to the AMC unit 64. At this time, preferably, the lowest MCS level is selected out of these three MCS levels as the current MCS level for an increase in throughput. In the event that the middle MCS level is selected, the quality of an actual channel may be inferior to that of the selected MCS level, which requires resending data. The resending of data results in a reduction in throughput. For this reason, although throughput is low, it is recommended the MCS level selection controller 66 select a low MCS level at beginning and gradually raise the MCS level to the optimum MCS level. Additionally, the current MCS level is adjusted according to the ACK signal or the NACK signal transmitted from the receiver 80 via the feedback channel 72. More specifically, if ACK signals are received from the receiver 80 more than a predetermined number of times, the MCS level selection controller 66 raises the current MCS level by one level. On the other hand, the NACK signal is received once, the MCS level selection controller 66 lowers the current MCS level by one level.

The AMC unit 64 receives a modulation signal x[i], which is modulated and coded from a transmission signal s[i] into which CRC data is added according to the information on the current MCS level, from the MCS level selection controller 66, and transmits it to the receiver 80. If the current MCS level is lowered by one level by the MCS level selection controller 66, the AMC unit 64 modulates and codes the transmission signal s[i] which is transmitted to a previous frame, and resends the result to the receiver 80.

The modulation signal x[i] is combined with channel noise G[i] and white noise n[i] while passing through the data channel 70, and transmitted to the receiver 80.

Subsequently, the receiver 80 also stores information on seven MCS levels corresponding to MCS groups, and groups these MCS levels into continuous three MCS groups. Further, the receiver 80 measures the quality of the data channel 70, using a common pilot signal (CPICH) transmitted from the transmitter 60. Here, the quality of the data channel 70 can be presented as a signal-to-information ratio (SIR) or a signal-to-noise ratio (SNR). The receiver 80 selects one from the three MCS groups according to the measured quality of the data channel 70, and transmits information on the selected MCS group to the transmitter 60 via the feedback channel 72. At this time, the information on the selected MCS group sent to the transmitter 60 is represented as 2 bits. The receiver 80 can restore the CRC data from the receiving signal y[i], and checks the occurrence of an error in a channel with the restored CRC data. The receiver 80 sends the ACK signal or the NACK signal to the transmitter 60 via the feedback channel 72, depending on whether the error occurs in the data channel using the restored CRC data. Here, the ACK signal indicates that the error does not occur in the data channel so that the receiver 80 receives the signal y[i] completely. Preferably, the receiver 80 includes a demodulation and decoding unit 82, a channel quality measurement unit 84 and an MCS group selection controller 86.

The demodulation and decoding unit 82 receives the receiving signal y[i], and demodulates and decodes the receiving signal y[i] to restore the transmission signal s[i] and the CRC data, which is used for error check. Through the restored CRC data, the demodulation and decoding unit 82 estimates whether an error occurs in the restored transmission signal s[i], and sends the result to the MCS group selection controller 86.

The channel quality measurement unit 84 measures the capability of transmission of data of the data channel 70, using the common pilot signal CPICH, which is periodically transmitted from the transmitter 60, and sends the measured result to the MCS group selection controller 86. As previously mentioned, the quality of the data channel 70 can be presented as SIR or SNR.

The MCS group selection controller 86 stores information regarding three groups that are classified according to information on seven MCS levels, and sends information on an MCS group corresponding to the quality of a channel measured by the channel quality measurement unit 84 to the transmitter 60 via the feedback channel 72 per predetermined cycle. Here, the MCS group selection controller 86 sets boundary values that are used to group MCS levels into MCS groups, compares the measured quality of a channel with boundary values between the MCS groups, and extracts a required MCS group based on the comparison result. Further, the MCS group selection controller 86 sends the ACK signal or the NACK signal to the transmitter 60, depending on whether an error occurs in the restoring of data by the demodulation & decoding unit 82.

Figure 7:
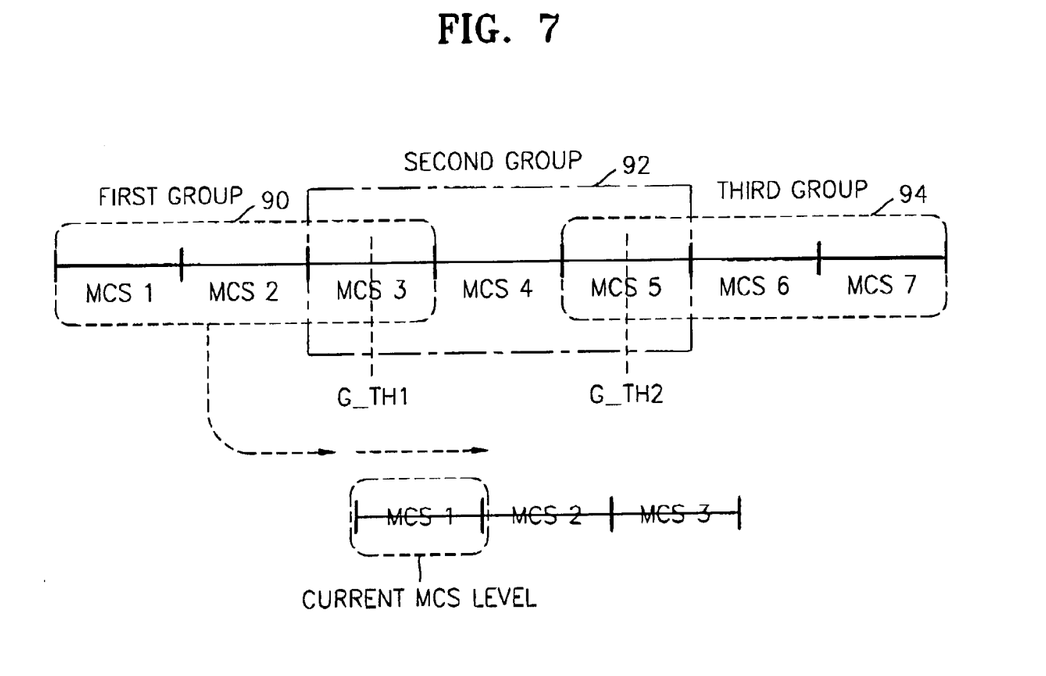
FIG. 7 is a view of a preferred embodiment of an MCS level group selected by an MCS group selection controller of FIG. 6.

FIG. 7 is a view of a preferred embodiment of an MCS level group selected by the MCS group selection controller 86, illustrated in FIG. 5. Referring to FIG. 7, MCS levels MCS1 through MCS3, MCS3 through MCS5, and MCS5 through MCS7 are grouped into a first group 90, a second group 92 and a third group 94, respectively. Here, MCS levels are grouped such that neighboring groups include at least one common MCS level. That is, an MCS level MCS3 is overlapped between the first and second groups 90 and 92, and an MCS level MCS5 is overlapped between the second and third groups 92 and 94.

Next, boundary values G_TH1 and G_TH2 are set to draw dividing lines between the first group 90, the second group 92, and the third group 94 in the overlapped MCS levels MCS3 and MCS 5. The MCS group selection controller 86 compares the quality value of a channel measured by the channel quality measurement unit 84 with the boundary values G_TH1 and G_TH2, and then extracts an MCS group corresponding to the quality of the current channel from these MCS groups, based on the comparison result. For instance, the MCS group selection controller 86 selects the first group 90 if the quality value of a channel measured by the channel quality measurement unit 84 is smaller than the boundary value G_TH1, and selects the third group 94 if the quality value of a channel is larger than the boundary value G_TH3. When the MCS level selection controller 66 in the transmitter 60 is given information on the first group 90 via the feedback channel 72, the lowest MCS level MCS1 out of the MCS levels MCS1 through MCS3 is selected as a current MCS level. Further, the current MCS level is gradually raised to the middle MCS level MCS2, and then to the highest MCS level MCS3 if the ACK signal is continuously received.

Figure 8:
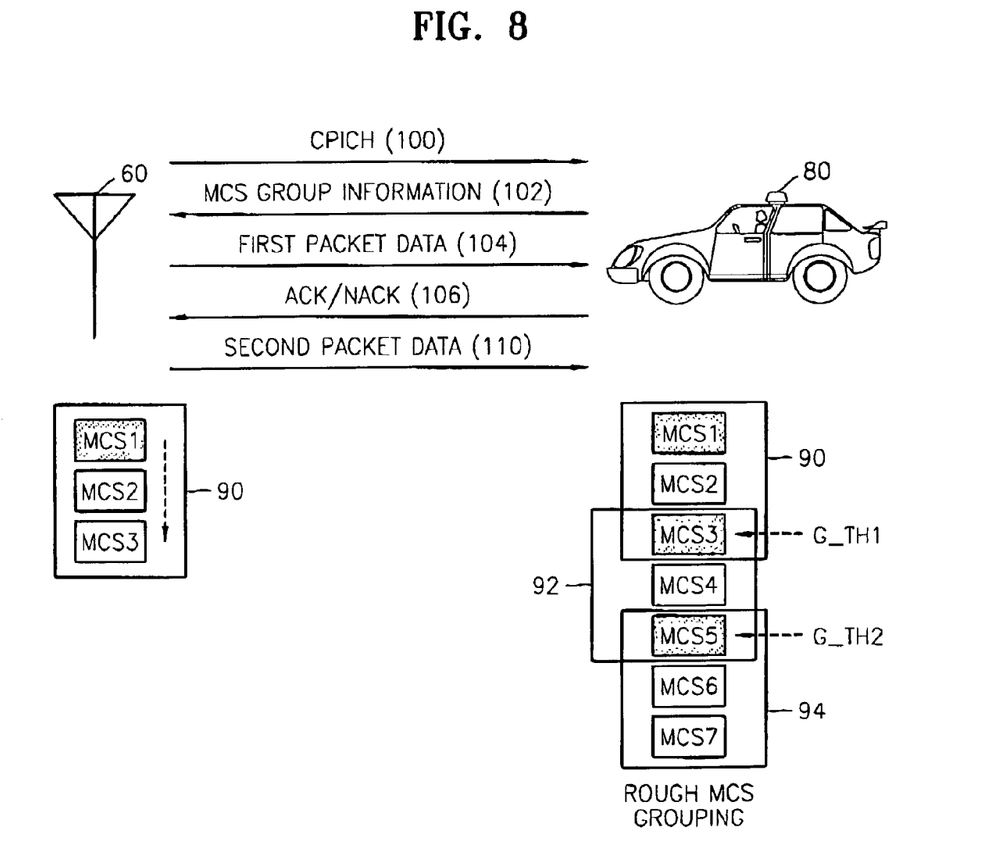
FIG. 8 is a view explaining a process of exchanging data between a transmitter and a receiver in the mobile communication system of FIG. 5.

FIG. 8 is a view explaining a process of exchanging data between the transmitter 60 and the receiver 80. Here, the transmitter 60 is a base station and the receiver 80 is installed in a mobile target such as an automobile.

Referring to FIGS. 5 and 8, in step 100, the transmitter 60 transmits a common pilot signal (CPICH) to the receiver 80 via a pilot channel (not shown). In step 102, the channel quality measurement unit 84 in the receiver 80 measures SIR or SNR of the data channel 70 to determine the quality of the data channel 70, using the pilot signal CPICH, selects one of the first through third groups by comparing the measured quality value of channel with boundary values G_TH1 through G_TH2, and sends information on the selected 2-bit group as information on a MCS group to the transmitter 60. For instance, if the quality of channel measured by the channel quality measurement unit 84 is for the first group 90, the MCS group selection controller 86 sends information on the first group 90 to the transmitter 60.

In step 104, the transmitter 60 sets the lowest MCS level MCS1 out of the MCS levels MCS1 through MCS3 as a current MCS level, based on the information on the first group 90, and then sends first packet data, which is modulated and coded from a transmission signal s[i] at the MCS level MCS1, to the receiver 80. The demodulation and decoding unit 82 in the receiver 80 receives a signal y[i] from the transmitter 60 via the data channel 70, and restores the original signal from the signal y[i]. In step 106, the MCS group selection controller 86 sends an ACK signal or an NACK signal to the transmitter 60, depending on whether the original signal is restored from the signal y[i]. Then, in step 110, the transmitter 60 receives the ACK signal from the receiver 80, and sends second packet data to the receiver 80.

At this time, if the ACK signal is continuously transmitted to the transmitter 60 from the receiver 80, the current MCS level is gradually raised, i.e., from MCS1 to MCS2 and finally, to MCS3. On the other hand, the transmitter 60 adjusts the current MCS level as MCS1 and resends the data, which was already transmitted, to the receiver 80 if the NACK signal is sent to the transmitter 60 when a transmission signal is modulated and coded and sent to the transmitter 80 at the MCS level MCS2.

As described above, the receiver 80 measures the quality of a channel using pilot signal CPICH, and sends the result to the transmitter 60. In the event that there are seven MCS levels, a conventional mobile communication system sends channel information of 3 bits to a transmitter, whereas a mobile communication system according to the present invention sends channel information of 2 bits to a transmitter because these seven MCS levels are grouped into three groups and information on these three groups is sent to the transmitter. That is, the amount of data to be transmitted to a transmitter according to the present invention is less than in the prior art. Additionally, a general receiver transmits channel information for every three slots, but a receiver according to the present invention can transmit channel information for every nine slots, because MCS levels are grouped and thus the receiver is not sensitive to a change in channels. Therefore, according to the present invention, the amount of data to be sent to a transmitter is reduced and a transmission period becomes longer, thereby preventing waste of uplink resources and consumption of a battery included in a receiver. Further, in a conventional mobile communication system, a receiver individually compares a quality value of a channel measured by a channel quality measurement unit with six boundary values G_TH1 through G_TH6 to select a MCS level, thereby complicating the circuit construction of the receiver and spending significant time in the selection of an appropriate MCS level. On the other hand, in a mobile communication system according to the present invention, an MCS group selection controller 86 provides information regarding a selected MCS group as the information on a channel, and the number of boundary values to be compared with a quality value of the channel is only two, i.e., G_TH1 and G_TH2. As a result, the circuit construction of the receiver can be simplified and time lost in the selection of an appropriate MCS level can be reduced.

A transmitter according to the present invention determines a current MCS level using rough channel information provided by a receiver, i.e., information on an MCS group, and optimizes the MCS level in response to an ACK signal or an NACK signal transmitted from the receiver. More specifically, the CRC method adopted by a general mobile communication system begins transmission of data at the lowest MCS level, and approaches the optimum MCS level while gradually increasing the level of MCS. In a case that the quality of channel is actually MCS7, for example, transmission of data covers the whole MCS levels MCS1 through MCS7, and thus, it takes time to approach the optimum MCS level. On the other hand, in the present invention, if the quality of channel is MCS7, information regarding a third group is sent to a transmitter. Then, the transmitter begins transmission of data at an MCS level MCS5, and approaches the optimum MCS level while gradually increasing the level of MCS7, thereby reducing time spent in approaching the optimum MCS level.

Figure 9:
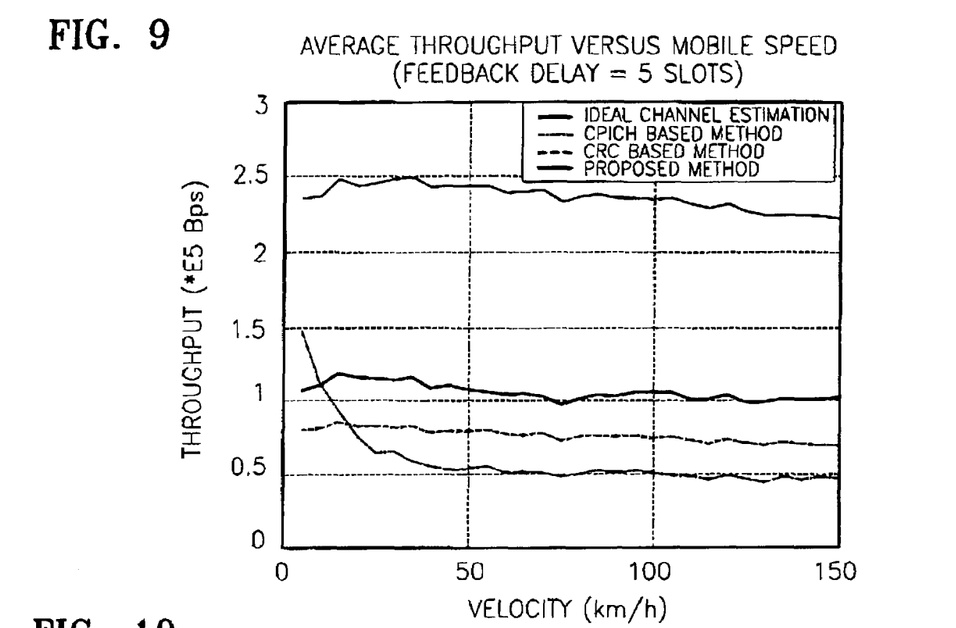
FIG. 9 is a graph illustrating an average throughput versus the moving speed of a receiver in comparison with the prior art.

FIG. 9 is a graph illustrating an average throughput versus the moving speed of a receiver in comparison with the prior art. From FIG. 9, it is noted that in a CPICH method, throughput is high at low moving speed, but it rapidly decreases as the moving speed increases. In a CRC method, throughput is almost not affected by the moving speed of a receiver, but throughput is generally low. On the other hand, according to the present invention, throughput hardly changes with respect to the moving speed of a receiver, but throughput is higher than in the CRC method.

Figure 10:
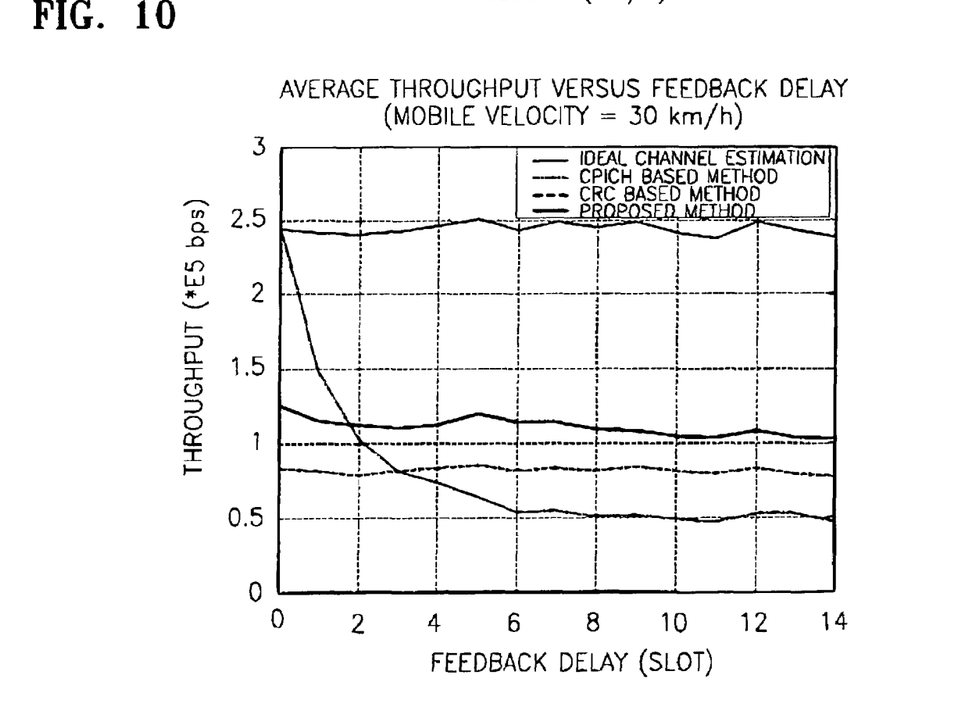
FIG. 10 is a graph illustrating an average throughput due to a delay in feedback caused when a receiver feeds back channel information to a transmitter in comparison with that in the prior art.

FIG. 10 is a graph illustrating a change in an average throughput caused by a delay in feedback when channel information is fed back from a receiver to a transmitter, in comparison with the prior art. In the CPICH method, throughput approximates an ideal throughput if no delay in feedback is caused, but the longer a delay in feed back is, the more throughput rapidly decreases. In the CRC method, a change in throughput is minimal irrespective of a delay in feedback, but the overall throughput is low. However, in the present invention, throughput hardly changes irrespective of a delay in feedback, but the overall throughput is higher than in the CRC method.

As described above, in a mobile communication system capable of increasing communication efficiency according to the present invention, a receiver groups MCS levels and sends rough channel information to a transmitter. Therefore, the amount of feedback information to be transmitted to a transmitter is less than in a CPICH method. Additionally, a delay in channel information is minimized by increasing a transmission period. Further, it is sufficient for a receiver to send rough information on an MCS group, rather than detailed information thereof, to a transmitter, which simplifies the circuit constitution of the receiver. Also, the transmitter transmits data based on rough channel information transmitted from the receiver, and therefore, it is possible to approach the optimum MCS level faster than in the CRC method.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A receiver for receiving an information signal and a pilot signal for measuring the quality of a channel, from an external transmitter, the receiver comprising:
   a demodulation and decoding unit for demodulating and decoding the information signal for detecting information data and cyclic redundancy channel (CRC) data which is used to detect an error contained in the information signal;
   a channel quality measurement unit measuring the capability of transmission of data of a data channel for receiving the information signal using the pilot signal; and
   a modulation and coding scheme (MCS) group selection controller for grouping n (where n>0) MCS levels, which are ordered according to the quality of the data channel, into continuous m MCS levels (where n>m>0), for selecting an MCS group according to the quality of the data channel measured by the channel quality measurement unit, for transmitting information on the selected MCS group to the transmitter every predetermined cycle, and for transmitting an ACK signal or an NACK signal to the transmitter depending on whether the CRC data is completely received from the transmitter.

2. The receiver as claimed in claim 1, wherein the quality of the channel is expressed as a signal-to-interference ratio (SIR) or a signal-to-noise ratio (SNR).

3. The receiver as claimed in claim 1, wherein the MCS group selection controller sets boundary values that delimit the MCS groups, and extracts the required MCS group by comparing the measured quality of the channel with the boundary values between the MCS groups.

4. The receiver as claimed in claim 3, wherein the MCS group selection controller groups the MCS levels such that at least one MCS level is overlapped by neighboring groups, and selects the boundary values, which delimit the MCS groups, in the overlapped MCS levels.

5. A data communication method performed by a receiver that receives a pilot signal transmitted periodically from an external transmitter for the measurement of the quality of a channel, and an information signal containing CRC data and information data, the data communication method comprising:
   (a) grouping n MCS levels (where n>0), which are ordered according to the quality of a data channel for transmitting the information signal, into continuous m MCS levels (where n>m>0);
   (b) measuring the capability of transmission of data of the data channel every predetermined period using the pilot signal, selecting one MCS group corresponding to the measured transmission capability of the data channel from the MCS groups, and transmitting information on the selected MCS group;
   (c) restoring the CRC data and the information data from the information signal when the information signal is transmitted from the transmitter; and
   (d) transmitting an ACK signal or an NACK signal to the transmitter, depending on whether the CRC data is completely transmitted.

6. A transmitter for periodically transmitting a pilot signal, which is used to measure the quality of a channel, to an external receiver, and modulating and coding information data to be transmitted according to information on the quality of the channel transmitted from the receiver, the transmitter comprising:
   a CRC adder for adding CRC data, which is used to detect an error in the channel, to the information data to be transmitted;
   an MCS level selection controller for storing information on n MCS levels (where n>0), which are ordered according to the quality of a data channel for transmitting the information data, extracting continuous m MCS levels (where n>m>0) from the MCS levels according to the quality of a channel, selecting one level out of the extracted MCS levels as a initial current MCS level and outputting the information on the selected MCS level, and changing the current MCS level in response to an ACK signal or an NACK signal that is fed back from the receiver that indicates whether an error occurs in the channel; and
   an adaptive modulation and coding (AMC) unit for modulating and coding information data including the CRC data according to the current MCS level and transmitting the result to the receiver.

7. The transmitter as claimed in claim 6, wherein the initial current MCS level is the lowest MCS level out of the m MCS levels.

8. The transmitter as claimed in claim 6, wherein the MCS level selection controller increases the current MCS level by one level when the ACK signal is continuously transmitted from the receiver more than a predetermined number of times, and decreases the current MCS level by one level when the NACK signal is transmitted from the receiver.

9. The transmitter as claimed in claim 6, wherein if the current MCS level is reduced by one level by the MCS level selection controller, the AMC unit modulates and codes again preceding information data, which is not transmitted to the receiver according to the reduced MCS level and resends the result to the receiver.

10. A data communication method performed by a transmitter that periodically transmits a pilot signal, which is used to measure the quality of a channel, to an external receiver, stores information on n MCS levels predetermined according to the quality of the channel (where n>0), and modulates and codes information data to be transmitted in response to the information on the quality of the channel transmitted from the receiver and an ACK signal or an NACK signal that indicates whether data is completely transmitted to the receiver, the data communication method comprising:
   (a) receiving information on the quality of the channel from the receiver;
   (b) extracting continuous m MCS levels (where n>m>0) from the n MCS levels ordered according to the information on the quality of the channel, and determining one of the extracted MCS levels as an initial current MCS level;

(c) adding CRC data, which is used to detect an error in the channel, to information data to be transmitted to the receiver;

(d) modulating and coding the information data including the CRC data according to the initial current MCS level, and transmitting the result to the receiver; and (e) changing the initial current MCS level in response to the ACK signal or the NACK signal transmitted from the receiver.

11. A mobile communication system comprising:
a receiver for grouping n MCS levels (where n>0) into continuous m MCS levels (where n>m>0) ordered according to the quality of a data channel for transmitting an information signal, selecting an MCS group, which corresponds to the measured quality of the data channel using a pilot signal transmitted from the outside, and sending information on the selected MCS group and an ACK signal or an NACK signal, which indicates whether the information signal is completely received; and
a transmitter for storing information on the n MCS levels, extracting the m MCS levels out of the n MCS levels according to the information on the MCS group transmitted from the receiver, determining one of the extracted m MCS levels as an initial current MCS level, modulating and coding information data to be transmitted according to the initial current MCS level and transmitting the result to the receiver, and changing the current MCS level in response to the ACK signal or the NACK signal.

12. The mobile communication system as claimed in claim 11, wherein the quality of the channel is expressed as a signal-to-interference ratio (SIR) or a signal-to-noise ratio (SNR).

13. The mobile communication system as claimed in claim 11, wherein the receiver groups the MCS levels such that at least one MCS level is overlapped on neighboring MCS groups.

14. The mobile communication system as claimed in claim 11, wherein the transmitter adds CRC data, which is used to detect an error in the data channel, to the information data, modulates and codes the information data including the CRC data according to the current MCS level, and transmits the result to the receiver.

15. The mobile communication system as claimed in claim 11, wherein the receiver demodulates and decodes the information signal, and generates the ACK signal or the NACK signal depending on whether the CRC data is normally detected.

16. The mobile communication system as claimed in claim 11, wherein the transmitter raises the MCS level by one level when it continuously receives the ACK signal from the receiver to the transmitter more than a predetermined number of times, and lowers the MCS level by one level when it receives the NACK from the receiver.

17. The mobile communication system as claimed in claim 11, wherein the transmitter modulates and again codes preceding information data which is not transmitted to the receiver according to the lowered MCS level when the MCS level is lowered by one level, and resends the result to the receiver.

18. A data transmission method performed between a transmitter and a receiver which are included in a mobile communication system, wherein the transmitter and the receiver store information on n MCS levels (where n>0) that are ordered according to the quality of a data channel for transmitting an information signal, the data transmission method comprising:

(a) the receiver grouping the n MCS levels into continuous m MCS levels (where n>m>0);

(b) the transmitter transmitting a pilot signal to the receiver;

(c) the receiver measuring the quality of the data channel, which is the path of transmitting the information signal, using the pilot signal, selecting one of the MCS groups according to the measured quality of the data channel, and sending information on the selected MCS group to the transmitter;

(d) the transmitter extracting m MCS levels according to the information on the MCS group, determining one of the extracted m MCS levels as a current MCS level, modulating and coding information to be transmitted according to the current MCS level, and transmitting the result as the information signal to the receiver;

(e) the receiver receiving the information signal from the transmitter via the data channel and restoring the original signal from the information signal, and transmitting an ACK signal or an NACK signal, which indicates whether the information signal is normally received, to the transmitter; and (f) the transmitter adjusting the current MCS level in response to the ACK signal or the NACK signal transmitted from the receiver.

19. The data transmission method as claimed in claim 18, wherein (f) comprises:

(f1) the transmitter raising the current MCS level by one level when the ACK signal is continuously transmitted from the receiver more than predetermined numbers of time, and lowering the current MCS level by one level when the NACK signal is transmitted from the receiver; and (f2) the transmitter modulating and again coding preceding data, which is not transmitted to the receiver, according to the lowered MCS level when the NACK signal is transmitted from the receiver, and resending the result to the receiver.

20. The data transmission method as claimed in claim 18, wherein in (d), the information data contains CRC data that is used to detect an error in the data channel, and
the receiver extracts the CRC data from the received information signal, estimating whether the information signal is completely transmitted to the receiver, and generating the ACK signal or the NACK signal.

21. The receiver as claimed in claim 1, wherein the MCS group selection controller groups the MCS levels such that at least one MCS level overlaps neighboring MCS groups.

22. The method as claimed in claim 5, wherein grouping the MCS levels includes overlapping at least one MCS level with neighboring MCS groups.

23. The transmitter as claimed in claim 6, wherein the MCS level selection controller extracts at least one MCS level that overlaps previously extracted MCS levels.

24. The method as claimed in claim 10, wherein the MCS level selection controller extracts at least one MCS level that overlaps previously extracted MCS levels.

25. The data transmission method as claimed in claim 18, wherein grouping the n MCS levels includes overlapping at least one MCS level with neighboring MCS groups.

* * * * *